United States Patent
Barbhaya et al.

(10) Patent No.: US 10,983,675 B1
(45) Date of Patent: Apr. 20, 2021

(54) SYSTEM AND METHOD FOR PROVIDING DYNAMIC AND DEEP NAVIGATION OF WEB PAGES USING KEYBOARD NAVIGATION

(71) Applicant: Intuit Inc., Mountain View, CA (US)

(72) Inventors: Sagar Bharat Barbhaya, Mountain View, CA (US); Theodore C. Drake, Mountain View, CA (US); Eric Knudtson, Mountain View, CA (US); Nischith Bagivalu Manjegowda, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 16/806,239

(22) Filed: Mar. 2, 2020

(51) Int. Cl.
| | |
|---|---|
| G06F 3/048 | (2013.01) |
| G06F 3/0483 | (2013.01) |
| G06F 3/0482 | (2013.01) |
| G06F 16/955 | (2019.01) |
| G06F 16/954 | (2019.01) |
| G06F 3/0489 | (2013.01) |

(52) U.S. Cl.
CPC .......... *G06F 3/0483* (2013.01); *G06F 3/0482* (2013.01); *G06F 3/0489* (2013.01); *G06F 16/954* (2019.01); *G06F 16/9558* (2019.01)

(58) Field of Classification Search
CPC ... G06F 3/0483; G06F 16/9558; G06F 16/954
See application file for complete search history.

(56) References Cited

U.S. PATENT DOCUMENTS

| | | |
|---|---|---|
| 6,292,188 B1 | 9/2001 | Carlson et al. |
| 2002/0080195 A1 | 6/2002 | Carlson et al. |
| 2008/0184147 A1 | 7/2008 | Anderson et al. |
| 2010/0058242 A1* | 3/2010 | Kimoto ................ G06F 3/0488 715/830 |
| 2012/0254801 A1* | 10/2012 | Gaffney ............... G06F 3/0482 715/825 |
| 2020/0089382 A1* | 3/2020 | Gray ..................... B60K 37/00 |

OTHER PUBLICATIONS

International Search Report dated Nov. 2, 2020 issued in International Application No. PCT/US2020/040396.
Written Opinion dated Nov. 2, 2020 issued in International Application No. PCT/US2020/040396.
Carter et al., "Dynamically adapting GUIs to diverse input devices", The 8th International ACM Sigaccess Conference on Omputers and Accessibility, Assets 2006, Oct. 23, 2006, pp. 63-70.
Blustein et al., "An evaluation of look-ahead breadcrubs for the WWW", Proceedings of the Sixteenth ACM Conference on Hypertext and Hypermedia, ACM, Sep. 5, 2005, pp. 202-204.

* cited by examiner

*Primary Examiner* — David E Choi
(74) *Attorney, Agent, or Firm* — DLA Piper LLP (US)

(57) ABSTRACT

Systems and methods configured to provide dynamic and deep navigation of web pages using keyboard navigation.

18 Claims, 12 Drawing Sheets

SYSTEM AND METHOD FOR PROVIDING DYNAMIC AND DEEP NAVIGATION OF WEB PAGES USING KEYBOARD NAVIGATION

BACKGROUND

Many accounting and financial services provide web page-based user interfaces with deep navigation levels stemming from an initial main page (also known as the root or root page). That is, the user interface may include an initial main page having information and fields that link to one or more sub-pages and each sub-page may link to other sub-pages, and so on. For example, a main page 10 of an accounting user interface may include a first region 20 with a number of selectable links 22, 24, 26 identifying particular clients/contacts associated with the service. Clicking on one of the links 22, 24, 26 may provide a client-specific sub-page with additional selectable links to one or more additional sub-pages for that client. The client specific sub-page may include links for one or more high-level features of the services provided to the particular client (e.g., banking, sales, expenses). Clicking on another link within the new sub-page may lead to other sub-pages that may include specific functions or features of the high-level feature (e.g., unpaid invoices, paid invoices), with each sub-page potentially containing links to further sub-pages. To get to a lower level sub-page with the particular information the user is looking for, the traditional process requires several link selections and page loads to navigate from the home page to the specific sub-page containing the desired information. For each loaded sub-page, the user must review its contents and then select the appropriate link to navigate to the next sub-page. As can be appreciated, the page downloading process is slow and requires the user to inspect each page or sub-page while it navigates to the sub-page of interest.

As shown in FIG. 1, the main page 10 may include a second region 30 with selectable links 32, 34, 36 to particular features of the service (e.g., clients, team, etc.) and a third region 40 with selectable links 42, 44, 46 to particular features associated with the current client (e.g., dashboard, banking sales, etc.). While the links 32, 34, 36, 42, 44, 46 in these regions 30, 40 may provide direct access to a sub-page, they do not help with further sub-level navigation (e.g., they do not direct the user to a specific function or feature attributable to a specific client). Thus, even with one or more regions 30, 40 comprising links 32, 34, 36, 42, 44, 46 to a specific sub-page, multiple page loads may still be required before the user navigates to the sub-page with the desired information.

For large systems with hundreds or thousands of sub-pages, the traditional navigation method is too slow and uses too much processing and storage resources, as multiple intervening data and graphic intensive page loads are required. Moreover, the traditional navigation method is static and inflexible as it depends on the structure of the user interface's architecture. Thus, there is a need and desire for a faster and dynamic mechanism for navigating a multi-level web page-based user interface.

DETAILED DESCRIPTION OF SEVERAL EMBODIMENTS

Embodiments described herein may be configured to provide dynamic and deep navigation of web pages using fast and simple keyboard navigation. In accordance with the disclosed principles, a keyboard driven menu is provided and may use standard communication protocol data requests such as e.g., API (application programming interface) calls to request and obtain data and generate navigation options for traversing multiple levels of a user interface's architecture without downloading a page or sub-page until the desired sub-page is reached using the menu. In one or more embodiments, a search interface and or filtering interface may be provided to further speed up the navigation when large amounts of menu options are available.

Figure 2:
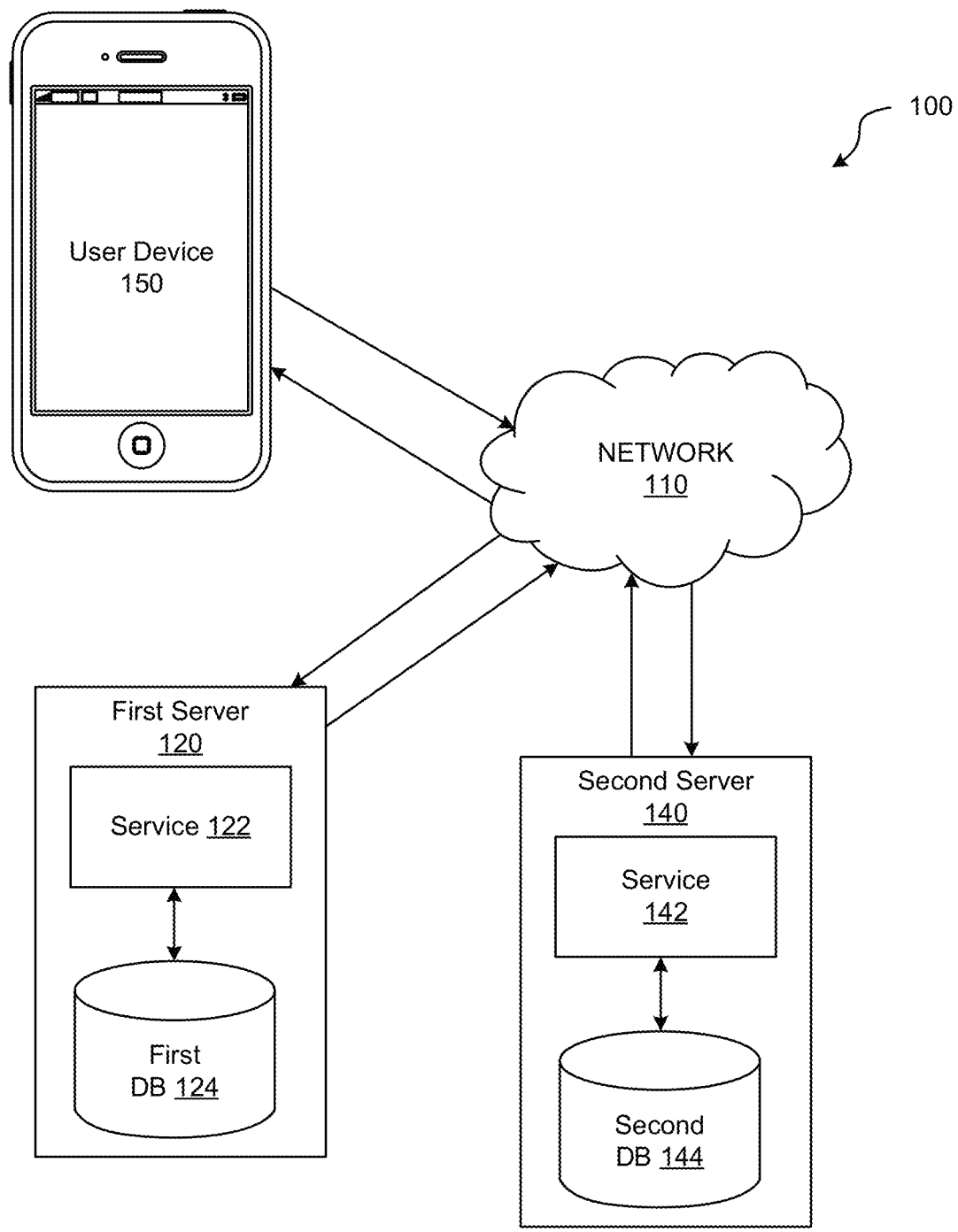
FIG. 2 shows an example of a system configured to provide dynamic and deep navigation of web pages using keyboard navigation according to an embodiment of the present disclosure.

FIG. 2 shows an example of a system 100 configured to provide dynamic and deep navigation of web pages according to an embodiment of the present disclosure. System 100 may include first server 120, second server 140, and/or user device 150. Network 110 may be the Internet and/or other public or private networks or combinations thereof. First server 120, second server 140, and/or user device 150 may be configured to communicate with one another through network 110. For example, communication between the elements may be facilitated by one or more application programming interfaces (APIs). APIs of system 100 may be proprietary and/or may be examples available to those of ordinary skill in the art such as Amazon® Web Services (AWS) APIs or the like.

First server 120 may be configured to perform the process for providing dynamic and deep navigation of web pages using keyboard navigation as described herein. First server 120 may include a first service 122, which may be configured to collect and process data content associated with a user interface and all of its various pages and sub-pages, and a first database 124, which may be configured to store the collected data and/or the outcome of the processing performed by the first service 122. Detailed examples of the data gathered, processing performed, and the results generated are provided below.

First server 120 may gather the data from first database 124, second server 140 and/or user device 150. For example, second server 140 may include second service 142, which may maintain accounting, financial or other data associated with users of the system 100 in second database 144 and transmit the data to first server 120. First service 142 may be any network 110 accessible service that may be used to implement accounting, financial and other services. A non-limiting example of first service 142 may include Mint®, TurboTax®, and QuickBooks®, and their respective variants (e.g., QuickBooks® Pro Accounting), by Intuit® of Mountain View Calif., other services, or combinations thereof. Detailed examples of the data gathered from first service 142 are provided below.

User device 150 may be any device configured to present user interfaces and receive inputs thereto. For example, user device 150 may be a smartphone, personal computer, tablet, laptop computer, or other device.

First server 120, second server 140, and user device 150 are each depicted as single devices for ease of illustration, but those of ordinary skill in the art will appreciate that first server 120, second server 140, and/or user device 150 may be embodied in different forms for different implementations. For example, any or each of first server 120 and second server 140 may include a plurality of servers. Alternatively, the operations performed by any or each of first server 120 and second server 140 may be performed on fewer (e.g., one or two) servers. In another example, a plurality of user devices 150 may communicate with first server 120 and/or second server 140. A single user may have multiple user devices 150, and/or there may be multiple users each having their own user device(s) 150.

Figure 3:
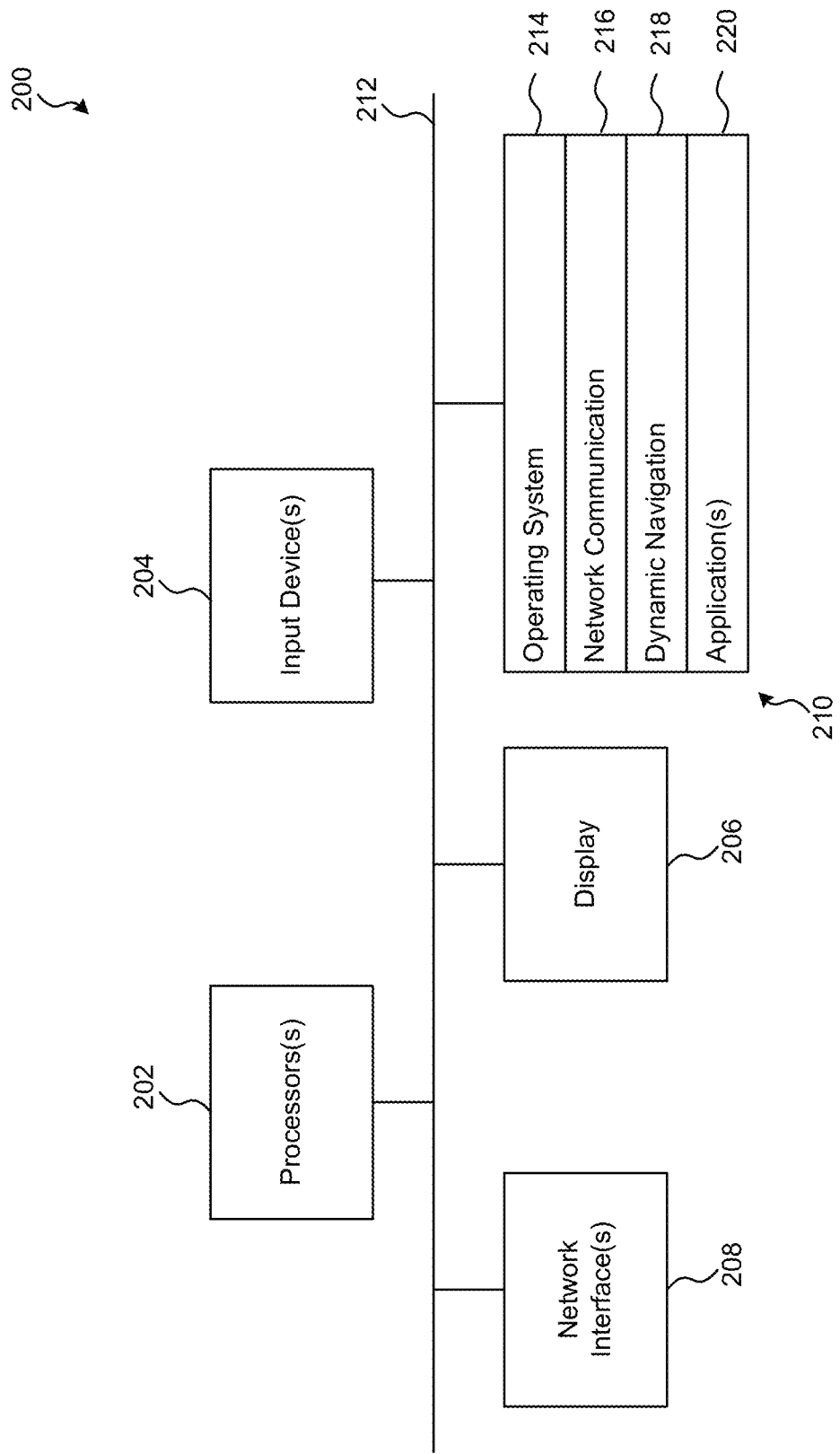
FIG. 3 shows a server device according to an embodiment of the present disclosure.

FIG. 3 is a block diagram of an example computing device 200 that may implement various features and processes as described herein. For example, computing device 200 may function as first server 120, second server 140, or a portion or combination thereof in some embodiments. The computing device 200 may be implemented on any electronic device that runs software applications derived from compiled instructions, including without limitation personal computers, servers, smart phones, media players, electronic tablets, game consoles, email devices, etc. In some implementations, the computing device 200 may include one or more processors 202, one or more input devices 204, one or more display devices 206, one or more network interfaces 208, and one or more computer-readable media 210. Each of these components may be coupled by a bus 212.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Dynamic navigation instructions 218 may include instructions that perform the process for providing dynamic and deep navigation of web pages using keyboard navigation as described herein. Application(s) 220 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks;

magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 4:
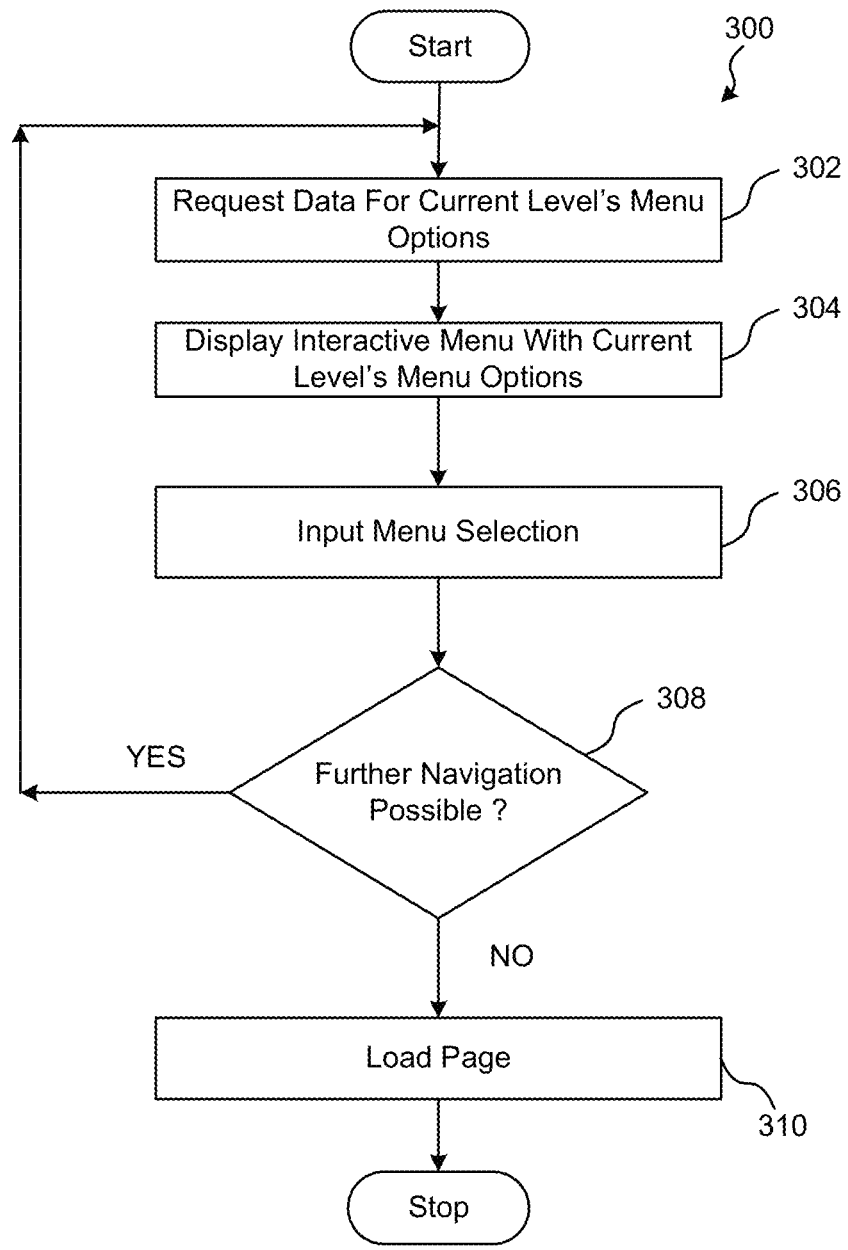
FIG. 4 shows an example process for providing dynamic and deep navigation of web pages using keyboard navigation according to an embodiment of the present disclosure.

FIG. 4 illustrates an example process 300 for providing dynamic and deep navigation of web pages using keyboard navigation according to an embodiment of the present disclosure. System 100 may perform some or all of the processing illustrated in FIG. 4. In one embodiment, the process 300 may be initiated upon the receipt of a user selection to initiate the dynamic keyboard navigation disclosed herein (also referred to as "Fast Nav" in the illustrated examples). For example, as discussed below with reference to FIG. 5, the main page (and sub-pages) of a web page-based user interface may include a selectable link or other selectable field to choose the dynamic keyboard navigation disclosed herein instead of the traditional link-based, page-loading navigation currently performed in the technical art. Once it is detected that the user selected the selectable link or other selectable field to initiate dynamic keyboard navigation, the process may begin at step 302.

In one embodiment, at step 302, the process 300 may request and obtain the data associated with the current page level's menu options. In one embodiment, the data for the current page level's menu options may include the data required to populate the current page or sub-page in the user interface. In one embodiment, one or more conventional communication protocol data requests such as e.g., API requests may be made to retrieve the data from one of the data sources within the system (e.g., first database 124, second database 144, user device 150).

Once the data is obtained, an interactive menu of options may be displayed within the current page or sub-page at step 304. In accordance with the disclosed principles, the menu is based on the current page's navigation structure (i.e., each menu option corresponds to a respective selectable link to a respective sub-page available from the current page). The menu may be designed to be navigated through use of a set of key selections such as e.g., the keyboard's directional keys (e.g., up, down, left and right arrows) and the "enter" key. For example, use of the right arrow key may cause the menu options of a next page or sub-page to be displayed (i.e., the user may navigate down one or more levels using the right arrow key). Similarly, use of the left arrow key may cause the menu options of a prior page to be displayed (i.e., the user may navigate up one or more levels using the left arrow key).

Thus, navigation of menu options for different levels is fast and easy and performed without page loads. Moreover, use of the up arrow key allows the user to scroll up in the current menu while use of the down arrow key allows the user to scroll down in the current menu, allowing for a quick and easy way to navigate and view menu options. In one embodiment, the use of the "enter" key may allow the user to select a specific menu option, which may cause other menu options to be displayed if the selection has selectable links to additional sub-pages or it may cause a page or sub-page to be loaded when no more menu options are available (i.e., when the sub-page has no selectable links to other sub-pages).

In one or more embodiments, the menu may also be navigated by the use of a specific letter to navigate the menu to options starting with that letter (i.e., a search feature). That is, pressing the letter s may cause the menu to jump directly to the menu options starting with the letter s. In one or more embodiments, search and or filter options may also be included within the dynamic keyboard driven menu (discussed further below with respect to FIG. 10).

At step 306, the process 300 may input the user's keyboard menu selection. At step 308, the process 300 may determine if further navigation is possible. For example, if the user highlights a menu option (using e.g., the up and or down arrow keys), and then selects the menu option (using e.g., the enter or right arrow key), the user is indicating that it wants to see the menu options (if any) for the next sub-page associated with the currently highlighted option. If the selected menu option corresponds to a sub-page having one or more selectable links, then further navigation to is possible. Unlike conventional systems, however, instead of loading the sub-page, the process 300 updates only the menu options within the interactive dynamic menu to reflect options of the appropriate level (i.e., sub-page) by continuing at step 302.

If at step 308, it is determined that the user selection does not require further navigation, the process 300 continues at step 310 where the appropriate page or sub-page may be loaded and displayed on the user interface. For example, if the user has used the "enter" key to select a menu option with no further sub-menu options (i.e., no further selectable links to additional sub-pages), the appropriate sub-page is loaded as keyboard navigation has taken the user to the appropriate page or sub-page. In accordance with the disclosed principles, using the dynamic keyboard navigated menu, intervening page or sub-page loads were not required for the user to navigate to the desired page or sub-page. The process 300 may be further explained with reference to the example user interface illustrated in FIGS. 5-12.

Figure 1:
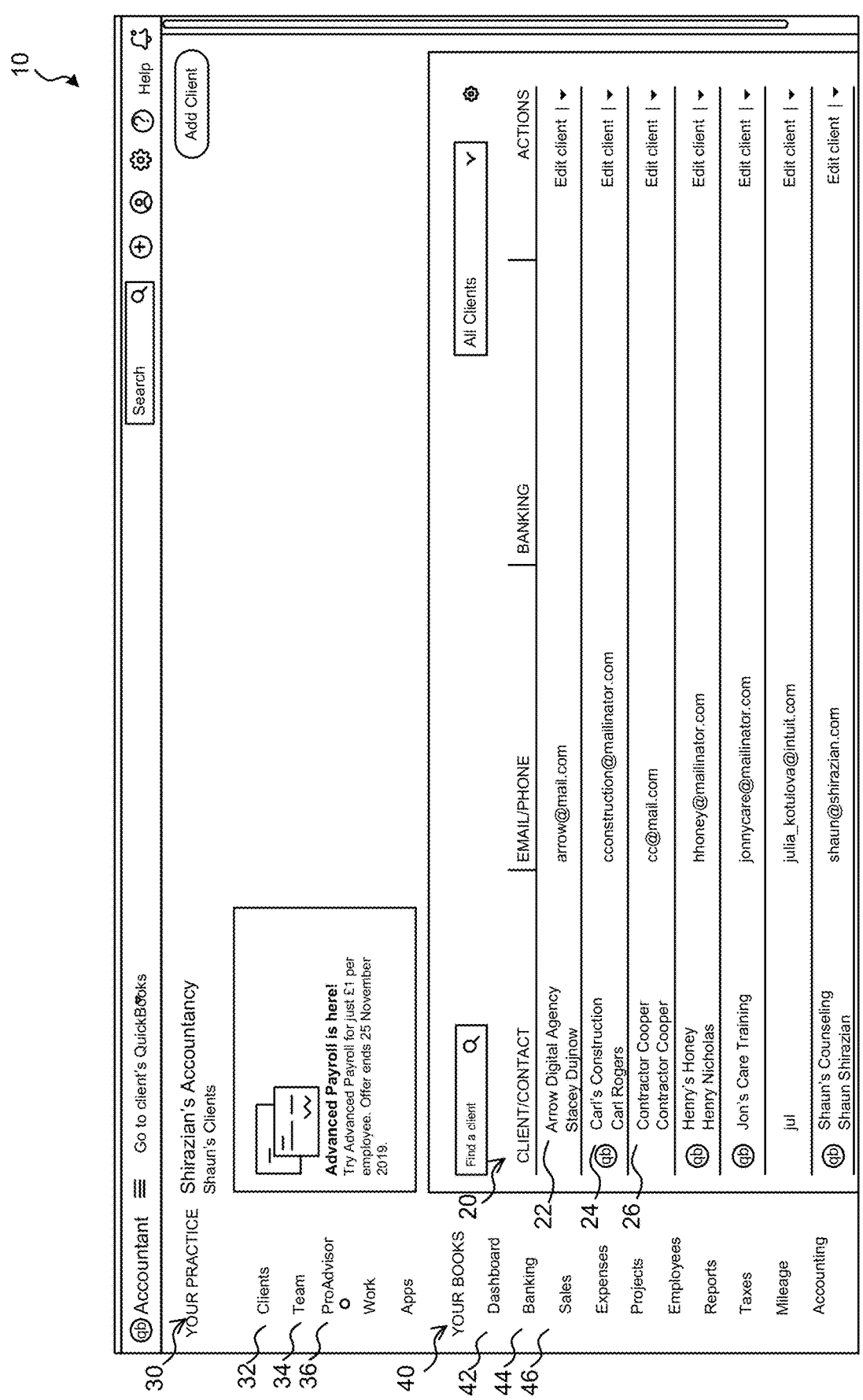
FIG. 1 shows an example main page of a web page-based user interface.
Figure 5:
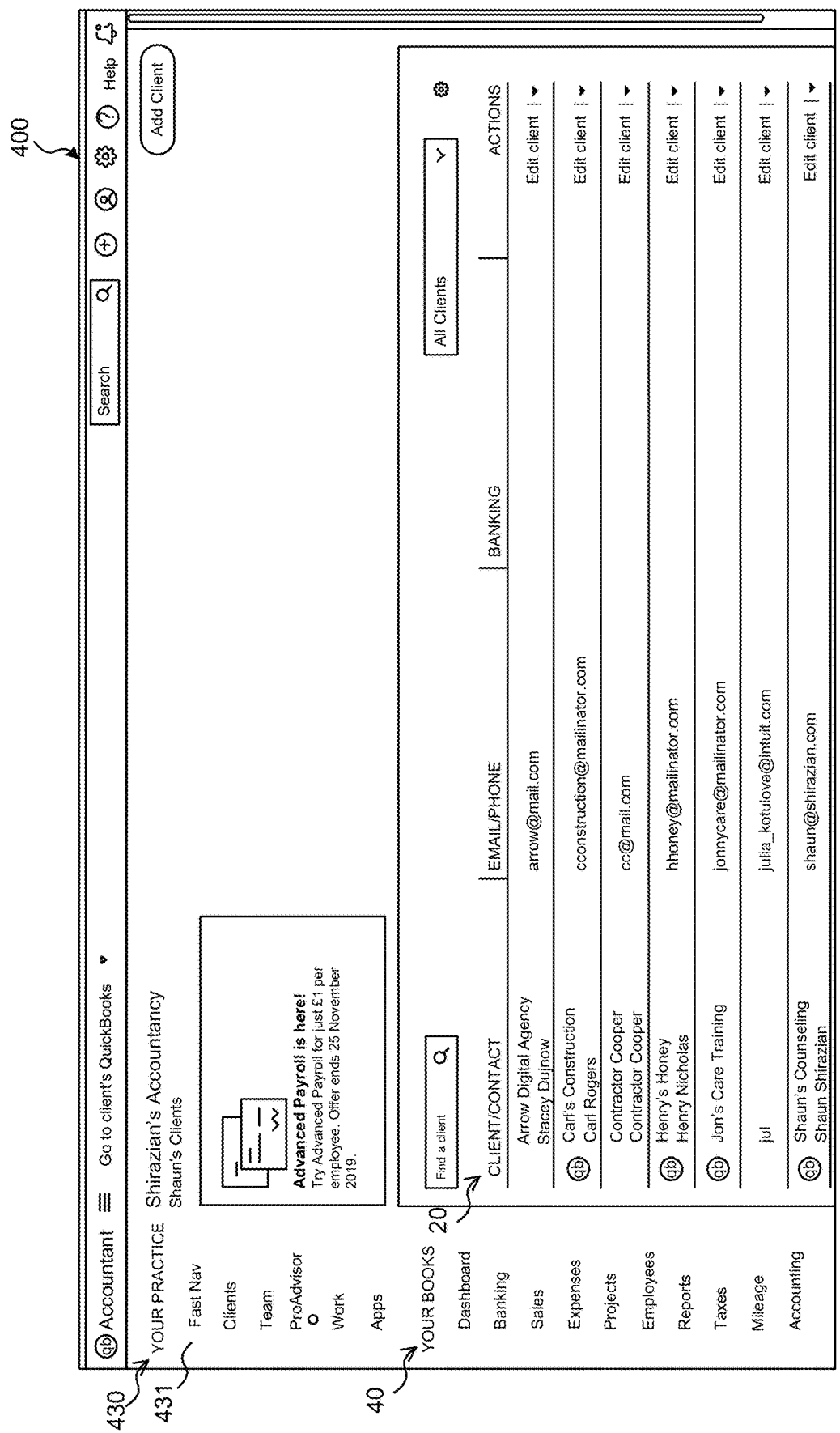
FIG. 5 shows an example of a main page of a web page-based user interface in accordance with the disclosed principles.

FIG. 5 shows an example of a main page 400 of a web page-based user interface in accordance with the disclosed principles. In the illustrated example, the main page 400 comprises regions 20 and 40, which are essentially the same as regions 20 and 40 discussed above with reference to FIG. 1. In the illustrated example, the main page 400 includes region 430, which may be a modified version of region 30 discussed above with respect to FIG. 1. In the illustrated example, region 430 also includes a selectable link 431 (identified as "Fast Nav") allowing the user to select and initiate the dynamic keyboard navigation disclosed herein (e.g., process 300).

Figure 6:
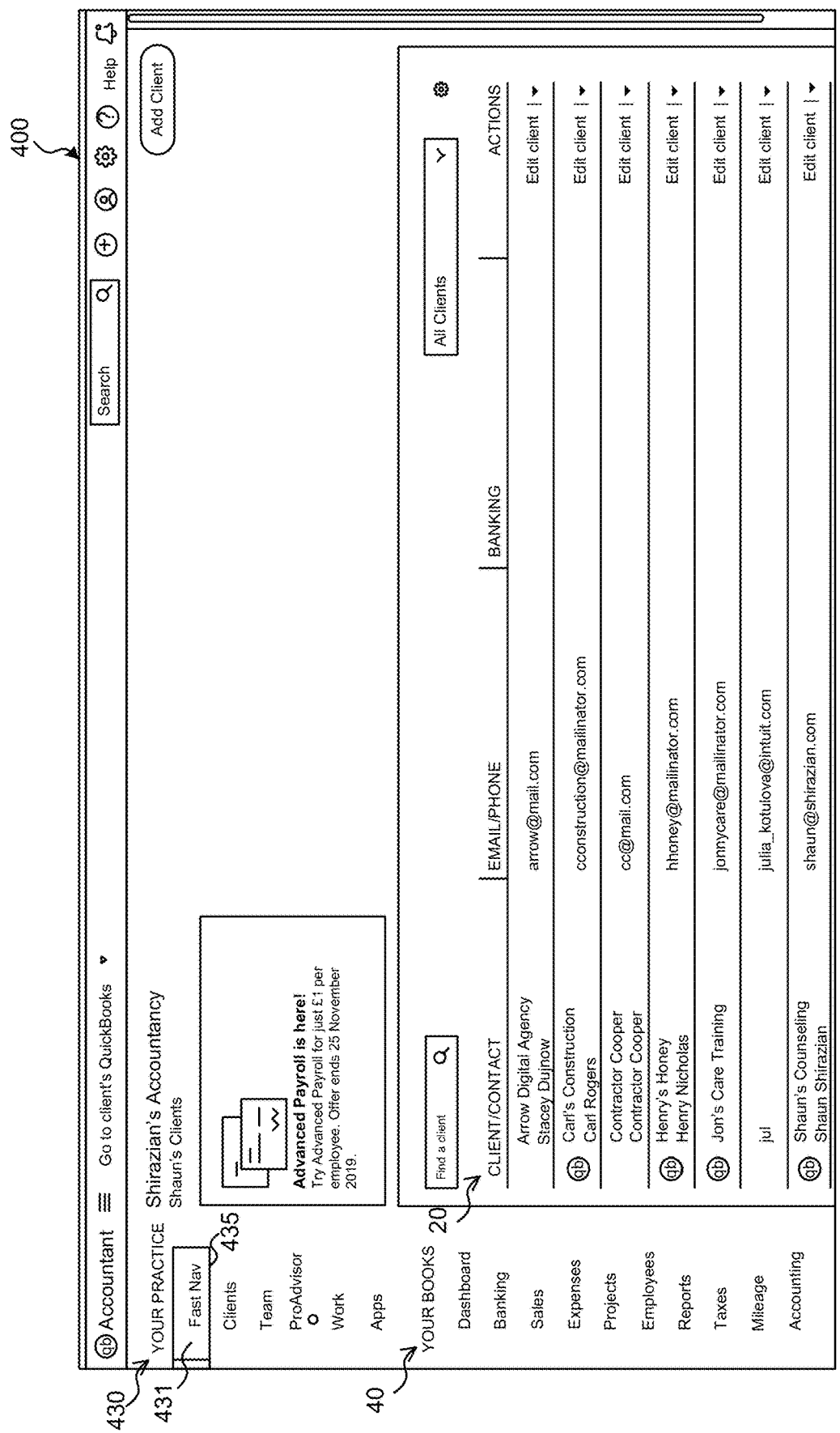
FIG. 6 shows the example main page of the web page-based user interface illustrated in FIG. 5 with the keyboard navigation feature of the disclosed principles being selected by a user.

FIG. 6 shows the example main page 400 with the keyboard navigation feature of the disclosed principles being selected by a user using link 431. In one embodiment, the link 431 may be highlighted by a box 435 when the user navigates over and or selects the link 431. In one or more embodiments, underlines, shading or some other appropriate mechanism may be used to emphasize that the user has navigated over and or selected the link 431. As discussed above, process 300 may be initiated upon the detection of the user's selection of link 431.

Figure 7:
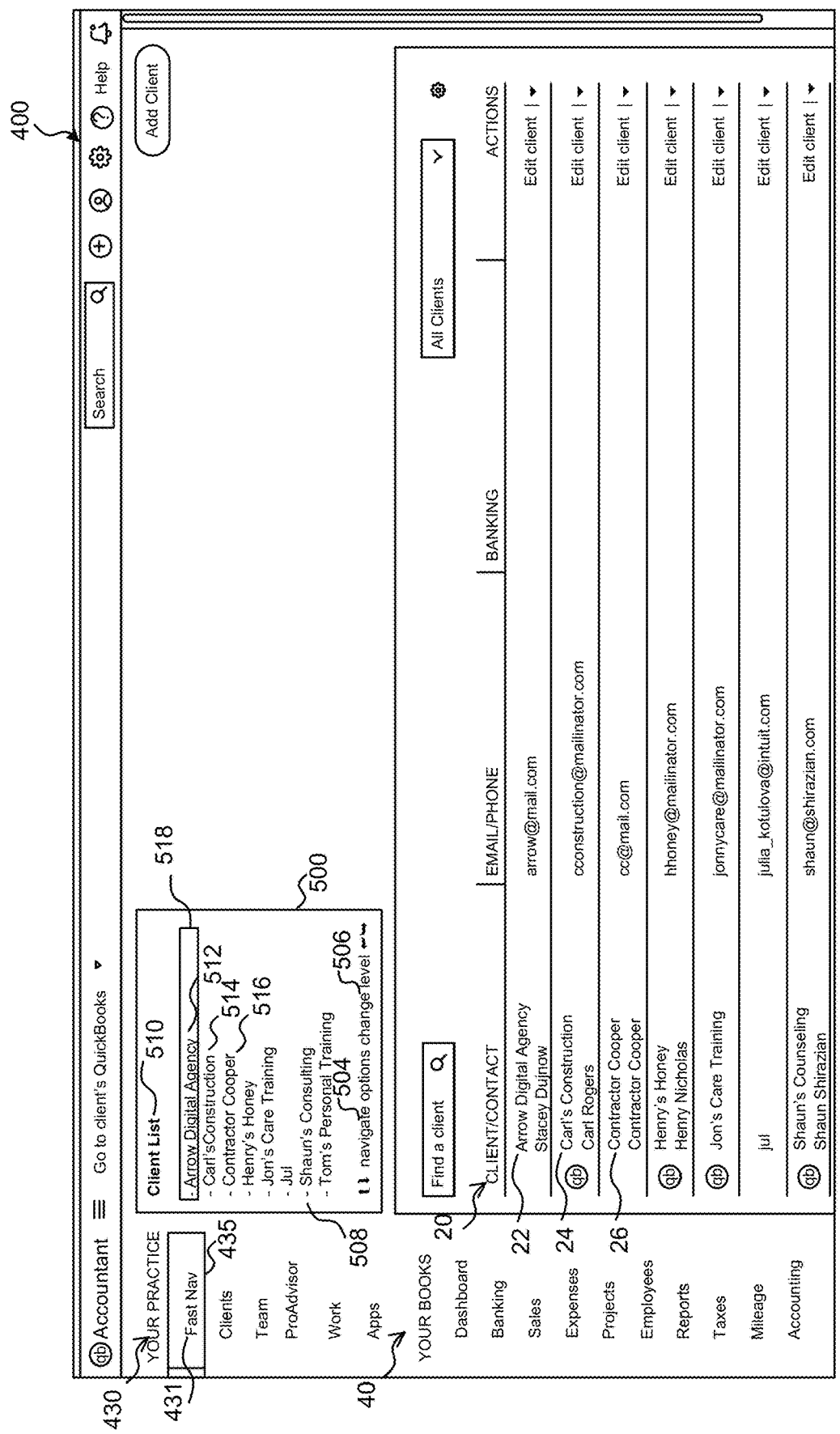
FIG. 7 shows the example main page of the web page-based user interface illustrated in FIG. 5 updated to include a first example keyboard-operated menu in accordance with the disclosed principles.

FIG. 7 shows the example main page 400 updated to include a first example keyboard-operated menu 500 in accordance with the disclosed principles. In the illustrated example, menu 500 includes a header region 510 identifying the contents of the menu 500 as "Client List." In accordance with the disclosed principles, the menu 500 may include all of the navigable features associated with the current level of the user interface (i.e., "Client List"). For example, the menu 500 may include a first menu option 512 for a first navigable feature identified as "Arrow Digital Agency." In one embodiment, the first menu option 512 may be highlighted by a box 518 when the user navigates over and or selects the option 512 by one of the mechanisms disclosed herein. In one or more embodiments, underlines, shading or some other appropriate mechanism may be used to emphasize that the user has navigated over and or selected the first menu option 512. In the illustrated example, the first menu option 512 may correspond to the selection of link 22 in region 20. The difference between the current process and the conventional process is that the selection of first menu option 512 would not result in the loading of the sub-page associated with link 22. Instead, the selection of first menu option 512 would result in an updated menu (e.g., menu 550 of FIG. 8), as discussed below in more detail.

In the illustrated example, the menu 500 includes a second menu option 514 for a second navigable feature identified as "Carl's Construction." In the illustrated example, the second menu option 514 may correspond to the selection of link 24 in region 20. The difference between the current process and the conventional process is that the selection of second menu option 514 would not result in the loading of the sub-page associated with link 24. Moreover, the menu 500 includes a third menu option 516 for a third navigable feature identified as "Contractor Cooper." In the illustrated example, the third menu option 516 may correspond to the selection of link 26 in region 20. The difference between the current process and the conventional process is that the selection of third menu option 516 would not result in the loading of the sub-page associated with link 26. As shown in FIG. 5, the menu may include additional menu options for other clients of the "Client List." These menu options may correspond to other clients and links in region 20.

In one or more embodiments, the menu 500 may include first and second informational fields 504, 506 that may be used to provide the user with instructions on how to navigate the menu options. In the illustrated example, first field 504 shows that the user may navigate through the menu options using the up and down arrows while field 506 shows that the user may change menu navigation levels using the left and right arrow keys, as discussed above with reference to FIG. 4. It should be appreciated that other information may be provided such as e.g., how to search for and or filter the menu options, how to use letters to navigate the menu options and or other mechanisms for selecting a menu option (e.g., use of the "enter" key).

Figure 8:
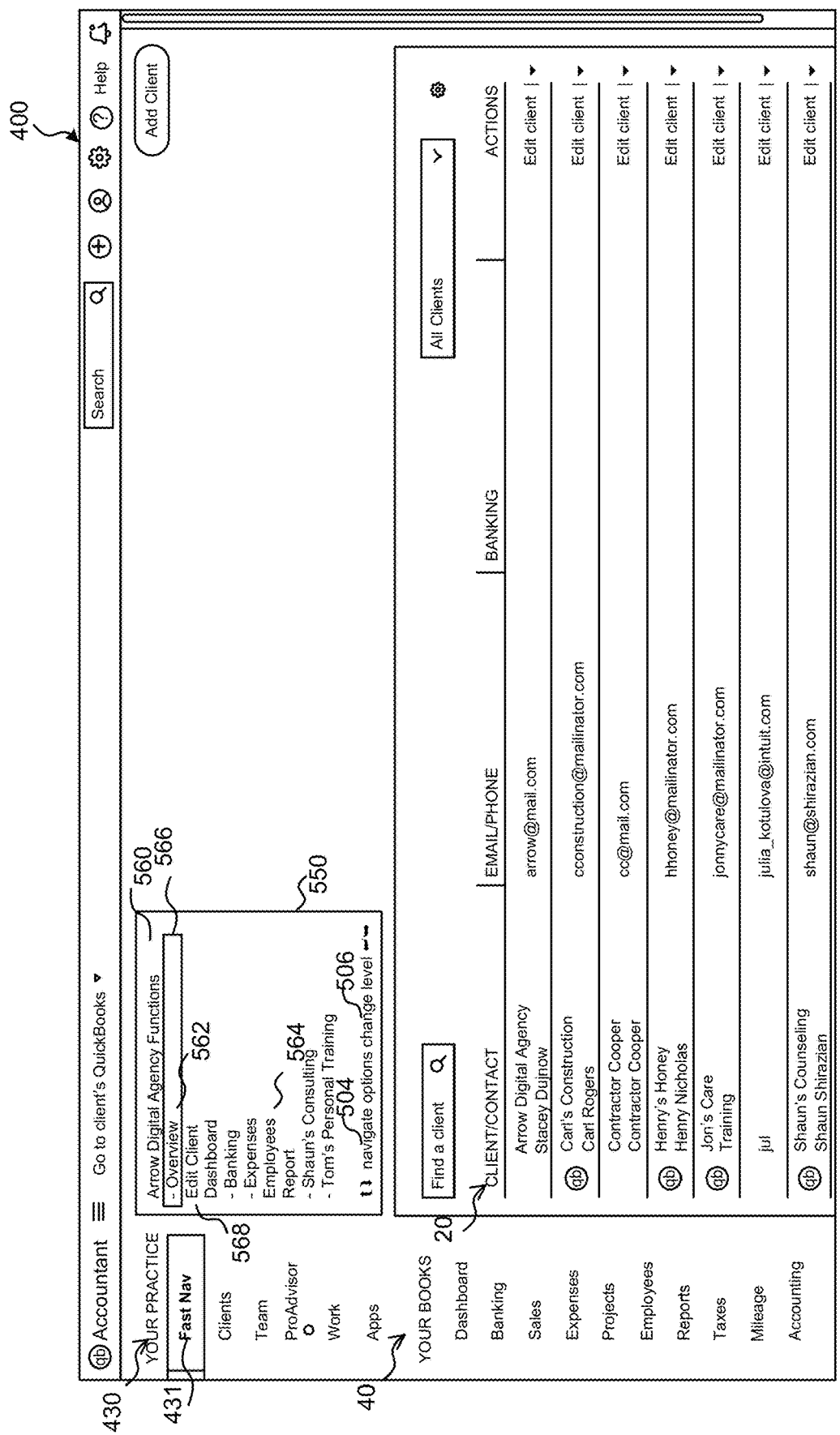
FIG. 8 shows the example main page of the web page-based user interface illustrated in FIG. 5 updated to include another example keyboard-operated menu in accordance with the disclosed principles.

FIG. 8 shows the example of the main page 400 updated to include a second example keyboard-operated menu 550 in accordance with the disclosed principles. In one embodiment, menu 550 is presented after the user selects the first menu option 512 from menu 500 (FIG. 7) and the process determines that the selected option is associated with a sub-page having one or more selectable links to other sub-pages. In the illustrated example, menu 550 includes a header region 560 identifying the contents of the menu 550 as "Arrow Digital Agency Function." In accordance with the disclosed principles, the menu 550 may include all of the navigable features (e.g., functions) associated with the current level of the user interface (i.e., "Arrow Digital Agency Functions"). For example, the menu 550 may include a first menu option 562 for a first navigable feature identified as "Overview." In one embodiment, the first menu option 562 may be highlighted by a box 566 when the user navigates over and or selects the option 562 by one of the mechanisms disclosed herein. In one or more embodiments, underlines, shading or some other appropriate mechanism may be used to emphasize that the user has navigated over and or selected the first menu option 562. In the illustrated example, the first menu option 562 may correspond to an "Overview" sub-page of the "Arrow Digital Agency" client page. As noted above, in accordance with the disclosed principles, the selection of first menu option 562 would not result in the loading of the "Overview" sub-page. Instead, selection of first menu option 562 would result in an updated menu (e.g., menu 600 of FIG. 9) as discussed below in more detail.

The illustrated menu 550 also includes a graphical symbol 568 proximate the first menu option 562 that may be used to show that the first menu option 562 has sub-options. For example, if the user used the "enter" key while the first menu option 562 was highlighted, the next menu (e.g., menu 600 of FIG. 9) may include additional sub-options/functions related to the "Overview" function. As shown in FIG. 8, not all menu options will include the graphical symbol 568 as shown by menu option 564 identified as the "Employees" function. That is, if the user used the "enter" key while menu option 564 was highlighted, it is possible that no more navigation is available and that the process 300 may load the page associated with the "Employees" function rather than displaying another menu on the user interface.

Figure 9:
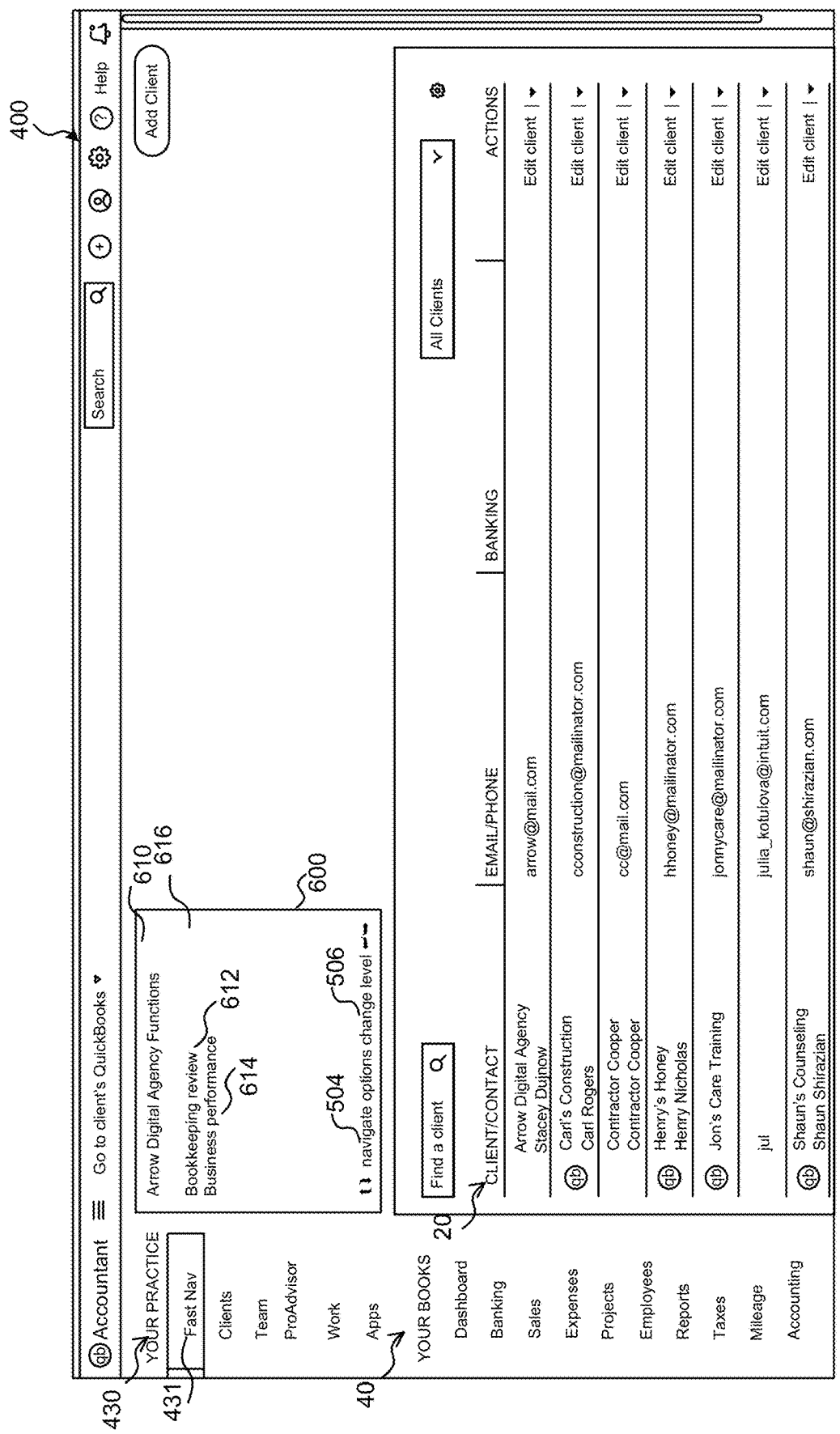
FIG. 9 shows the example main page of the web page-based user interface illustrated in FIG. 5 updated to include yet another example keyboard-operated menu in accordance with the disclosed principles.

FIG. 9 shows the example of the main page 400 updated to include a third example keyboard-operated menu 600 in accordance with the disclosed principles. In one embodiment, menu 600 is presented after the user selects the first menu option 562 from menu 550 (FIG. 8) and the process determines that the selected option is associated with a sub-page having one or more selectable links to other sub-pages. In the illustrated example, menu 600 includes a header region 610 identifying the contents of the menu 600 as "Arrow Digital Agency Overview." In accordance with the disclosed principles, the menu 600 may include all of the navigable features (e.g., functions) associated with the current level of the user interface (i.e., "Arrow Digital Agency Overview"). For example, the menu 600 may include a first menu option 612 for a first navigable feature identified as "Bookkeeping Review." In one embodiment, the first menu option 612 may be highlighted by a box 616 when the user navigates over and or selects the option 612 by one of the mechanisms disclosed herein. In one or more embodiments, underlines, shading or some other appropriate mechanism may be used to emphasize that the user has navigated over and or selected the first menu option 612. In the illustrated example, the first menu option 612 may correspond to a "Bookkeeping Review" sub-page of the "Arrow Digital Agency Overview" client page. Menu 600 may also include a second menu option 614 for a first navigable feature identified as "Business Performance." In the illustrated example, the second menu option 614 may correspond to a "Business Performance" sub-page of the "Arrow Digital Agency Overview" client page. The second menu option 614 is not highlighted in the illustrated example.

In the illustrated example, the first menu option 612 and second menu option 614 have no further navigation as illustrated by the lack of a graphical symbol (e.g., graphical symbol 568). In accordance with the disclosed principles, selection of the first menu option 612 may cause the "Bookkeeping Review" sub-page to be loaded into the user interface while selection of the second menu option 614 may cause the "Bookkeeping Review" sub-page to be loaded into the user interface. As can be appreciated, this would be the first page load performed by the system 100.

Figure 10:
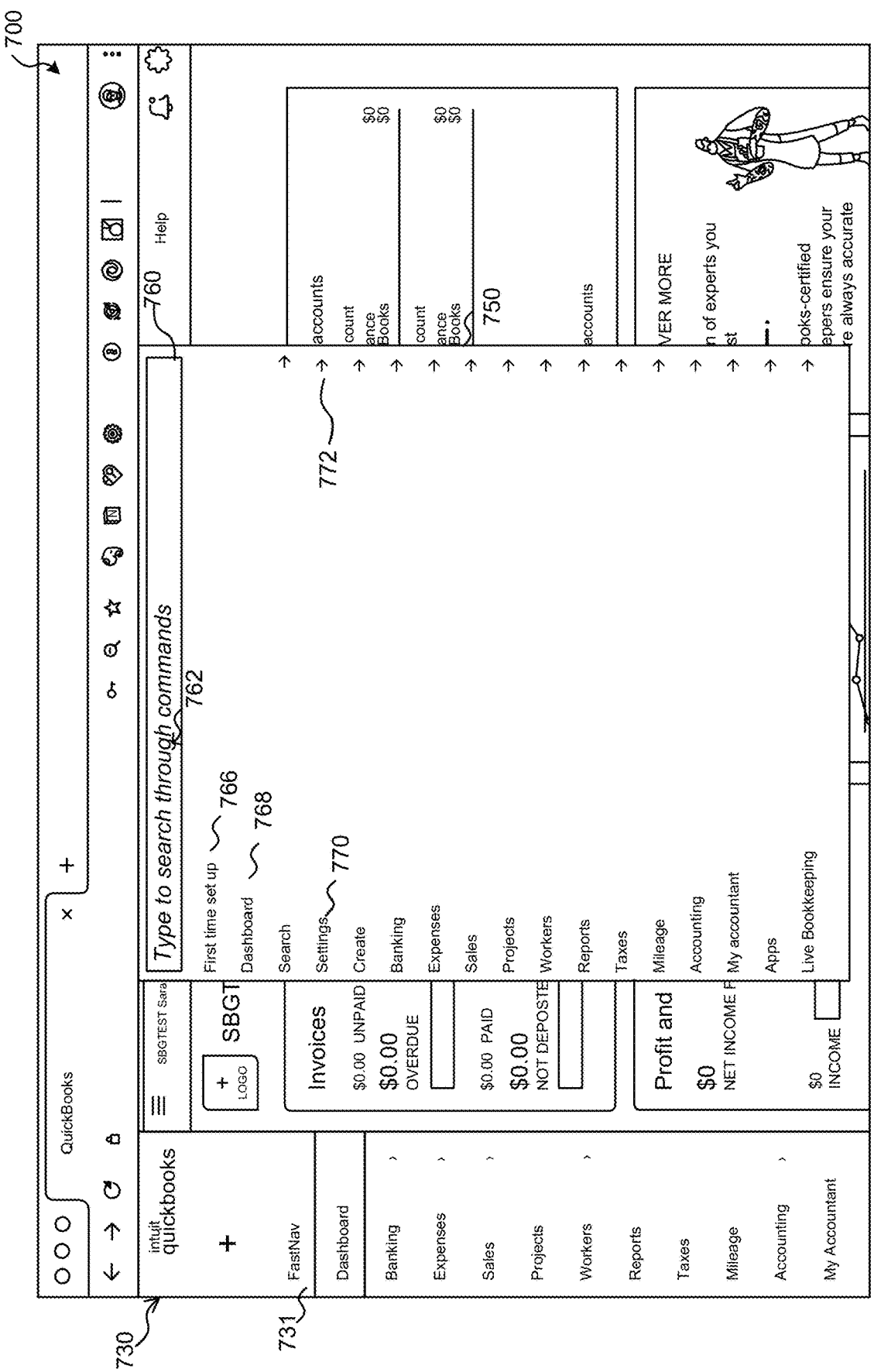
FIG. 10 shows another example of a main page of a web page-based user interface in having another example keyboard-operated menu in accordance with the disclosed principles.

FIG. 10 shows another example of a main page 700 of a web page-based user interface in accordance with the disclosed principles. In the illustrated example, the main page 700 includes region 730, which may be a modified version of region 30 discussed above with respect to FIG. 1. In the illustrated example, region 730 also includes a selectable link 731 (identified as "Fast Nav") that when selected allows the user to initiate the dynamic keyboard navigation disclosed herein (e.g., process 300). The selection of the link 731 may be performed in the same manner as discussed above with respect to FIGS. 5 and 6 for link 431. In the example illustrated in FIG. 10, it is presumed that the user has already selected the link 731, which caused another example keyboard-operated menu 750 to be displayed in accordance with the disclosed principles.

In accordance with the disclosed principles, the menu 750 may include all of the navigable features associated with the main page. For example, the menu 750 may include a first menu option 766 for a first navigable feature identified as "First-time set-up," a second menu option 768 for a second navigable feature identified as "Dashboard," a third menu option 770 for a third navigable feature identified as "Settings," as well as other menu options that are not labeled. As with other embodiments, the menu 750 may be populated with options by retrieving, from a server or database, data associated with navigable options for the main page using e.g., an API request or call as discussed above in more detail.

The illustrated menu 750 also includes a graphical symbol 772 proximate the third menu option 770 that may be used to show that the third menu option 770 has sub-options. For example, if the user used the "enter" key or right arrow key while the first menu option 770 was highlighted, the next menu (e.g., menu 800 of FIG. 12) may include additional sub-options/functions related to the "Settings" function. As shown in FIG. 10, not all menu options will include the graphical symbol 772 as shown by menu option 766 identified as the "First-time set-up" function and menu option 768 identified as the "Dashboard" function. That is, if the user used the "enter" key while menu option 766 was highlighted, it is possible that no more navigation is available and that the process 300 may load the page associated with the "First-time set-up" function rather than displaying another menu on the user interface.

In the illustrated example, menu 750 includes a search/filter region 760 which may be used by the user to enter text to identify a menu option without scrolling through the list of menu options. In the illustrated embodiment, the search/filter region 760 contains text 762 stating "Type to search through commands" serving as an instruction for the user. In one or more embodiments, searching via the search/filter region 760 may include an autocomplete feature, which will complete or suggest text to complete the content being typed by the user. In one or more embodiments, once a user enters a first letter in the search/filter region 760, a list of menu options beginning with that letter may be displayed within the menu 750. In one or more embodiments, as the user enters more text into search/filter region 760, the displayed list may become shorter as less options may correspond to the text being entered by the user. As can be appreciated, when the menu 750 contains numerous menu options, the search/filter region 760 may dramatically decrease the time it takes for the user to get to the desired menu option.

Figure 11:
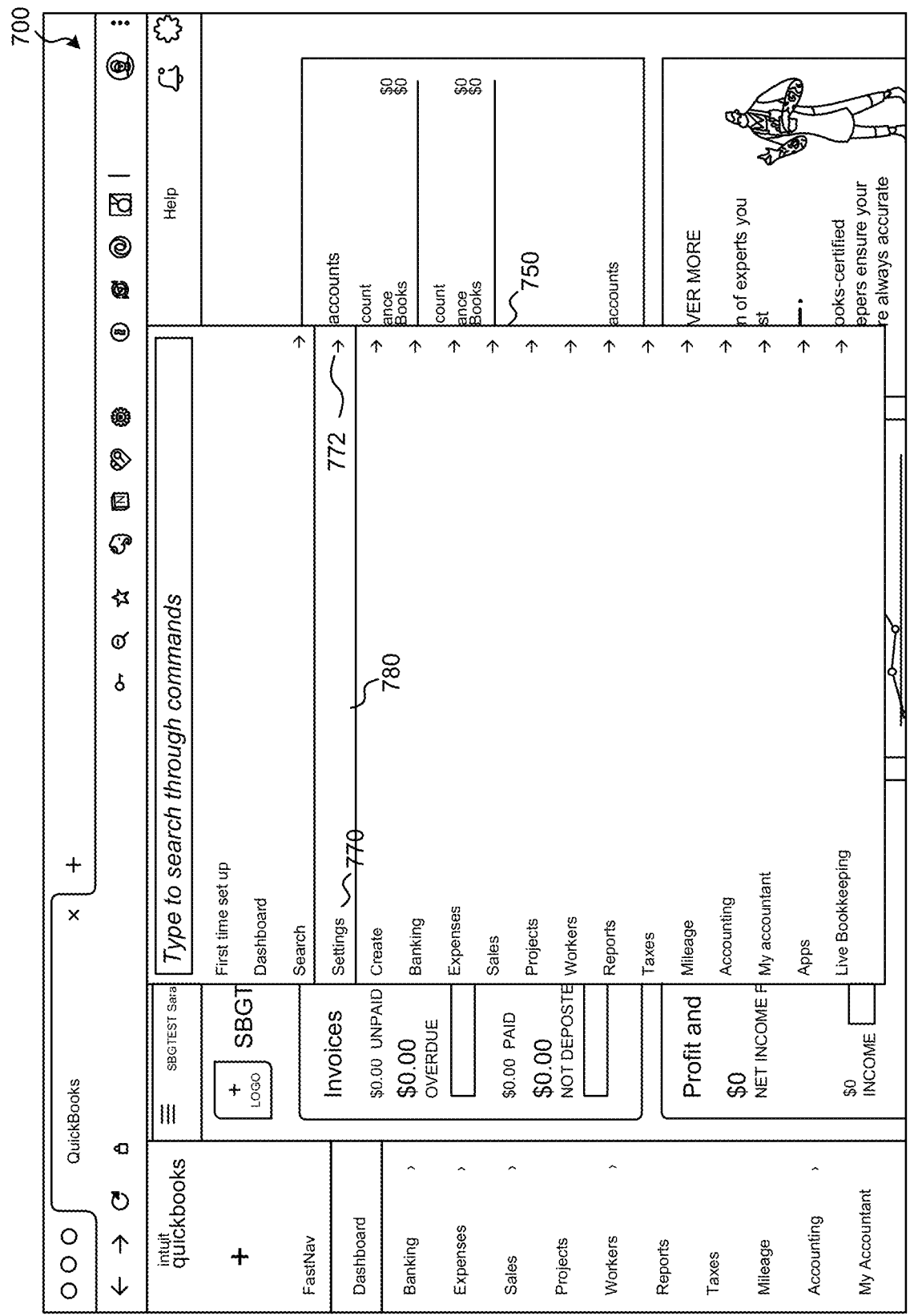
FIG. 11 shows the example main page of the web page-based user interface illustrated in FIG. 10 with a first menu option being selected by a user in accordance with the disclosed principles.

FIG. 11 shows the example main page 700 with the third menu option 770 in the process of being selected by a user in accordance with the disclosed principles. In one embodiment, the third menu option 770 may be highlighted by a box 780 when the user navigates over and or selects the option 770 by one of the mechanisms disclosed herein. In one or more embodiments, underlines, shading or some other appropriate mechanism may be used to emphasize that the user has navigated over and or selected the third menu option 770.

Figure 12:
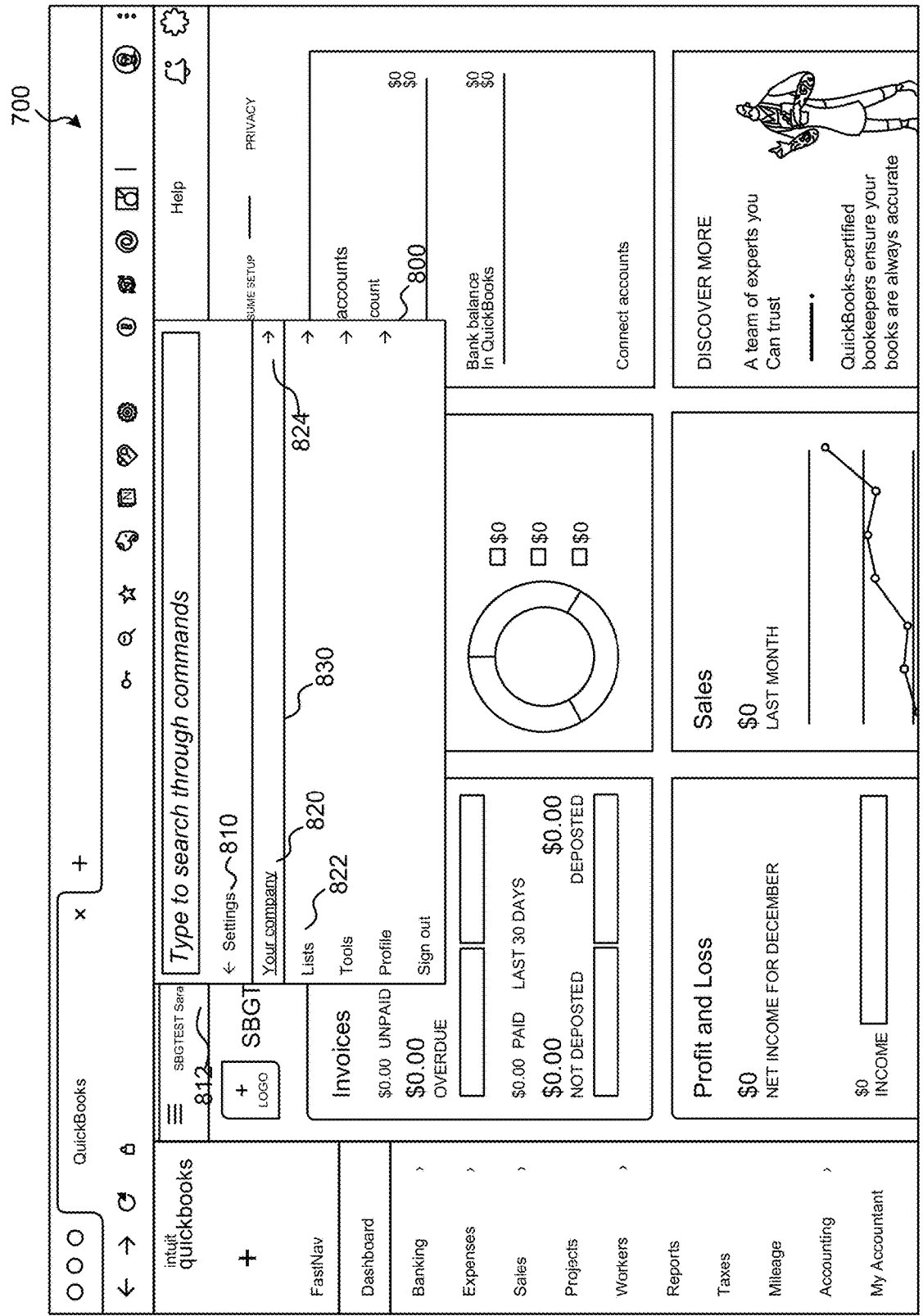
FIG. 12 shows the example main page of the web page-based user interface illustrated in FIG. 10 updated to include another example keyboard-operated menu in accordance with the disclosed principles.

FIG. 12 the example main page 700 updated to include another example keyboard-operated menu 800 in accordance with the disclosed principles. In one embodiment, menu 800 is presented after the user selects the third menu option 770 from menu 750 (FIG. 11) and the process determines that the selected option is associated with a sub-page having one or more selectable links to other sub-pages. In the illustrated example, menu 800 includes a header region 810 identifying the contents of the menu 800 as "Settings." In accordance with the disclosed principles, the menu 800 may include all of the navigable features (e.g., particular tools or settings) associated with the current level of the user interface (i.e., "Settings"). For example, the menu 800 may include a first menu option 820 for a first navigable feature identified as "Your Company" and a second menu option 822 for a second navigable feature identified as "Lists."

In the illustrated example, the header region 810 includes a graphical symbol 812, which may be an indication to the user that the user may navigate up one level. In the illustrated example, menu 800 also includes a graphical symbol 824 proximate the first menu option 820 that may be used to show that the first menu option 820 has sub-options. For example, if the user used the "enter" key or right arrow key while the first menu option 820 was highlighted, another menu of options related to the "Your Company" setting may be presented over the main page 700.

In one embodiment, the first menu option 820 may be highlighted by a box 830 when the user navigates over and or selects the option 820 by one of the mechanisms disclosed herein. In one or more embodiments, underlines, shading or some other appropriate mechanism may be used to emphasize that the user has navigated over and or selected the first menu option 820.

As can be appreciated, the disclosed principles create a keyboard-driven menu based on a current page's navigation structure. The user may be able to navigate the options via arrow keys, choose an option, and move up/down to a new level. This allows the user to move bidirectionally within the user interface's architecture without intervening page or sub-page loads. In one embodiment, the navigation interface menu options are populated via e.g., API requests and do not require a page load until the user chooses an option and or no further navigation is possible. Thus, page loads are delayed by using API calls to provide the dynamic menu with navigable levels until the user has selected a menu option that does not lead to further subpages. One of skill in the art would understand the benefits of doing so. For example, while API calls and page loads both involve retrieving data across the network, page loads are more processor and data resource intensive. Specifically, page loads require more HTML and or JavaScript to be retrieved and almost the entire user interface needs to be redrawn for the new page/subpage. Thus, it is beneficial to delay/avoid page loads as much as possible, even if that means retrieving data using API calls.

The disclosed principles would benefit an accounting system by e.g., allowing an accountant to quickly choose a client and analyze their outstanding invoices without navigating through numerous intervening sub-pages that are not related to invoices. The disclosed principles may also allow a user to find and evaluate inventory SKUs (stock keeping units) from any page of the user interface.

The disclosed principles provide several advantages over existing systems where static navigation and submenus are used. These static navigation and submenus are based on the user interface's information architecture and have several problems. For example, type-ahead search forms may allow filtering, but they are based on search results and do not allow the bidirectional navigation only provided by the disclosed principles. Navigation options are available in different technical fields such as e.g., screen readers. These menus allow navigation of a page by structural elements such as headings, lists, or form inputs. However, these menu options are limited to the existing page and are not for navigating within the remainder of the user interface.

In one or more embodiments, the use of the disclosed dynamic navigation enables simple keyboard navigation of complicated user interface architectures. As noted above, by eliminating unneeded page loads, the disclosed principles reduce processing load and storage resources, as multiple intervening data and graphic intensive page loads are avoided. The disclosed menu is dynamic as menu options are created on the fly (e.g., via API or other communication protocol requests) and are not tied to headings or other static fields within a static page or sub-page of a user interface. These are major improvements in the technological art as they improve the functioning of the computer and are also an improvement to the technology and technical fields of online accounting and financial systems.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer implemented method comprising:
outputting a first page of a graphical user interface to a display of a computing device, the first page comprising a first region comprising a plurality of first selectable links to respective first sub-pages;
outputting a first menu at a second region on the first page, the first menu comprising a plurality of first menu options, each first menu option corresponding to a respective one of the first selectable links;
receiving an input of a selection of one of the first menu options;
determining if a first sub-page associated with a first selectable link corresponding to the selected first menu option comprises one or more second selectable links to respective second sub-pages;
outputting a second menu at the second region on the first page when it is determined that the first sub-page associated with the first selectable link corresponding to the selected first menu option comprises one or more second selectable links to respective second sub-pages, the second menu comprising one or more second menu options, each second menu option corresponding to a respective one of the second selectable links; and
loading the first sub-page associated with the first selectable link corresponding to the selected first menu option when it is determined that the first sub-page associated with the first selectable link corresponding to the selected first menu option does not comprise one or more second selectable links to respective second sub-pages.

2. The method of claim 1, wherein outputting the first menu on the first page comprises:
obtaining data corresponding to the first selectable links; and
outputting the first menu on the first page based on the obtained data.

3. The method of claim 2, wherein obtaining data corresponding to the first selectable links comprises initiating a communication protocol data request requesting data from a data source.

4. The method of claim 1, wherein the first menu is a keyboard driven menu and receiving the input of a selection of one of the first menu options comprises receiving an input of a selection of a key associated with selecting a menu option.

5. The method of claim 1, wherein the first menu is a keyboard driven menu and said method further comprises providing a first set of key selections for navigating between the first menu options and a second set of key selections for navigating between page levels of the user interface.

6. The method of claim 1, further comprising providing a search feature on the first menu.

7. The method of claim 1, wherein outputting the second menu on the first page comprises:
obtaining data corresponding to the second selectable links; and
outputting the second menu on the first page based on the obtained data.

8. The method of claim 1, wherein the second menu is a keyboard driven menu and said method further comprises providing a first set of key selections for navigating between the second menu options and a second set of key selections for navigating between page levels of the user interface.

9. A computer implemented method comprising:
outputting a first page of a graphical user interface to a display of a computing device, the first page comprising a first region comprising a plurality of first selectable links to respective first sub-pages;
obtaining data corresponding to the first selectable links;
outputting a first menu at a second region on the first page based on the obtained data, the first menu comprising a plurality of first menu options, each first menu option corresponding to a respective one of the first selectable links;
receiving an input of a selection of one of the first menu options;
determining if a first sub-page associated with a first selectable link corresponding to the selected first menu option comprises one or more second selectable links to respective second sub-pages;
outputting a second menu at the second region on the first page when it is determined that the first sub-page associated with the first selectable link corresponding to the selected first menu option comprises one or more second selectable links to respective second sub-pages, the second menu comprising one or more second menu options, each second menu option corresponding to a respective one of the second selectable links; and
loading the first sub-page associated with the first selectable link corresponding to the selected first menu option when it is determined that the first sub-page associated with the first selectable link corresponding to the selected first menu option does not comprise one or more second selectable links to respective second sub-pages.

10. A system for providing dynamic navigation of web pages within a graphical user interface, said system comprising:
a first computing device connected to:
output a first page of the graphical user interface to a display, the first page comprising a first region comprising a plurality of first selectable links to respective first sub-pages;
output a first menu at a second region on the first page, the first menu comprising a plurality of first menu options, each first menu option corresponding to a respective one of the first selectable links;
receive an input of a selection of one of the first menu options;
determine if a first sub-page associated with a first selectable link corresponding to the selected first menu option comprises one or more second selectable links to respective second sub-pages;
output a second menu at the second region on the first page when it is determined that the first sub-page associated with the first selectable link corresponding to the selected first menu option comprises one or more second selectable links to respective second sub-pages, the second menu comprising one or more second menu options, each second menu option corresponding to a respective one of the second selectable links; and
load the first sub-page associated with the first selectable link corresponding to the selected first menu option when it is determined that the first sub-page associated with the first selectable link corresponding to the selected first menu option does not comprise one or more second selectable links to respective second sub-pages.

11. The system of claim 10, wherein outputting the first menu on the first page comprises:
obtaining data corresponding to the first selectable links; and
outputting the first menu on the first page based on the obtained data.

12. The system of claim 11, wherein obtaining data corresponding to the first selectable links comprises initiating a communication protocol data request requesting data from a data source.

13. The system of claim 10, wherein the first menu is a keyboard driven menu and receiving the input of a selection of one of the first menu options comprises receiving an input of a selection of a key associated with selecting a menu option.

14. The system of claim 10, wherein the first menu is a keyboard driven menu and said wherein the first computing device is further configured to provide a first set of key selections for navigating between the first menu options and a second set of key selections for navigating between page levels of the user interface.

15. The system of claim 10, wherein the first computing device is further configured to provide a search feature on the first menu.

16. The system of claim 10, wherein outputting the second menu on the first page comprises:
obtaining data corresponding to the second selectable links; and
outputting the second menu on the first page based on the obtained data.

17. The system of claim 10, wherein the second menu is a keyboard driven menu and said wherein the first computing device is further configured to provide a first set of key selections for navigating between the second menu options and a second set of key selections for navigating between page levels of the user interface.

18. The system of claim 17, wherein the first computing device is further configured to provide a search feature on the second menu.

* * * * *